H. S. HALLWOOD.
CASH REGISTER.
APPLICATION FILED OCT. 21, 1901.

992,128.

Patented May 9, 1911.
6 SHEETS—SHEET 1.

WITNESSES:

INVENTOR
Henry S. Hallwood
BY
C. C. Shepherd
ATTORNEY

H. S. HALLWOOD.
CASH REGISTER.
APPLICATION FILED OCT. 21, 1901.

992,128.

Patented May 9, 1911.

WITNESSES:

INVENTOR
Henry S. Hallwood
BY
C. C. Shepherd
ATTORNEY

H. S. HALLWOOD.
CASH REGISTER.
APPLICATION FILED OCT. 21, 1901.

992,128.

Patented May 9, 1911.

Witnesses:
Nathan F. Fretter.
Brennan B. West.

Inventor.
Henry S. Hallwood.
By D. E. Fouts
Atty

H. S. HALLWOOD.
CASH REGISTER.
APPLICATION FILED OCT. 21, 1901.

992,128.

Patented May 9, 1911.

WITNESSES:
J. H. Fravel
H. B. Bradshaw

INVENTOR
Henry S. Hallwood
BY
C. C. Shepherd
ATTORNEY

UNITED STATES PATENT OFFICE.

HENRY S. HALLWOOD, OF COLUMBUS, OHIO, ASSIGNOR, BY MESNE ASSIGNMENTS, TO HIMSELF AND ANNIE HALLWOOD, OF COLUMBUS, OHIO.

CASH-REGISTER.

992,128.  Specification of Letters Patent.  Patented May 9, 1911.

Application filed October 21, 1901. Serial No. 79,329.

*To all whom it may concern:*

Be it known that I, HENRY S. HALLWOOD, a citizen of the United States, residing at Columbus, in the county of Franklin and State of Ohio, have invented a certain new and useful Improvement in Cash-Registers, of which the following is a specification.

My invention relates to the improvement of cash registers and indicators and the objects of my invention are to provide a cash register and indicating mechanism of comparatively simple and inexpensive construction; to provide a simple and reliable adding and transfer mechanism; to so construct my improved machine as to necessitate the depression in succession of an initial, value and department key in order to effect registration and indication; to so construct my improved machine as to provide for the retention of previously operated value and department keys in depressed positions until a key of the initial group has been operated, the keys thus retained in the depressed position indicating in conjunction with the rotary indicators or targets the last transaction; to provide improved key locking mechanism whereby a previously depressed value key is retained in its depressed position until an initial key is depressed and improved mechanism whereby a previously depressed department key is retained in a depressed position until a value key is depressed and whereby the depression of a department key releases a previously depressed initial key; to provide means for releasing and operating the cash drawer independently of the registering mechanism and without affecting either the keys or indicaing devices; to provide improved means for releasing the drawer on depression of a no sale or change key without affecting the registering or indicating mechanism and to produce other improvements the details of which will be more fully pointed out hereinafter. These objects I accomplish in the manner illustrated in the accompanying drawings, in which—

Fig. 11 is a detail view in perspective of the key locking and releasing mechanism. Fig. 12 is an enlarged section on line $v\ v$ of Fig. 1. Fig. 13 is a similar section on line $q\ q$ of Fig. 1. Fig. 14 is a similar view on line $r\ r$ of Fig. 1.

Similar numerals refer to similar parts throughout the several views.

Figure 1:
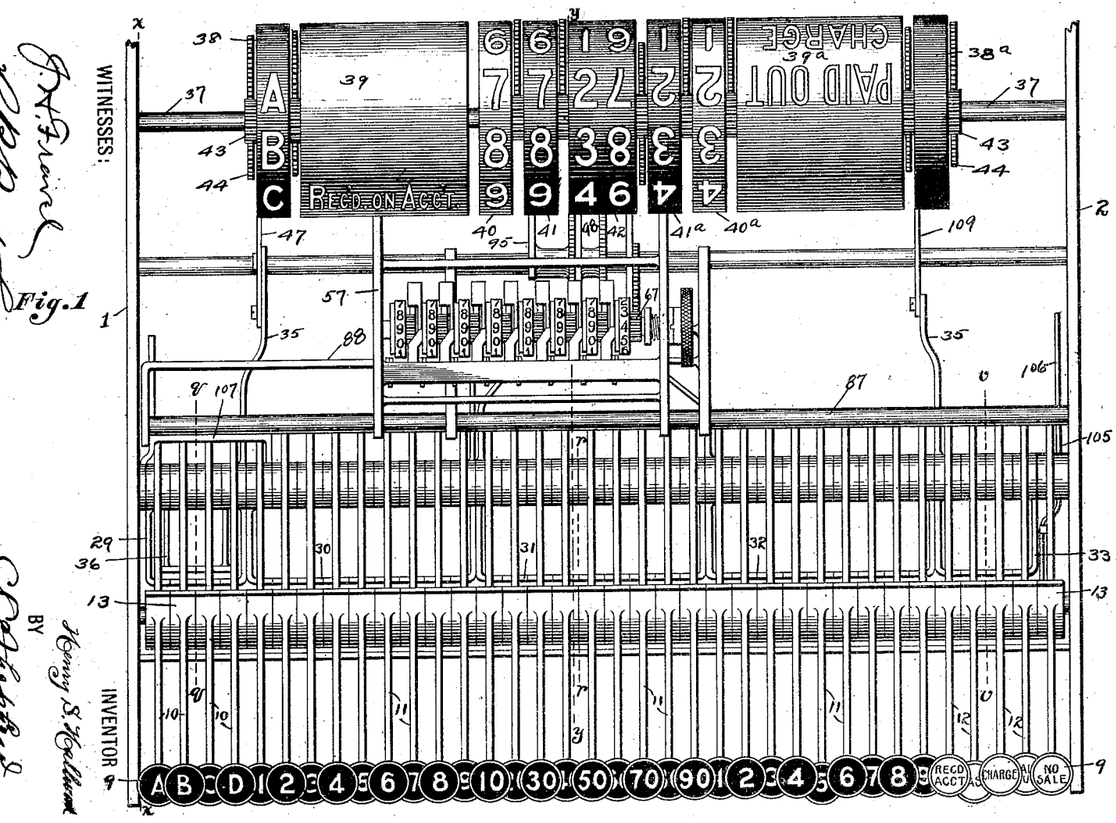
Figure 1 is a plan view of my improved register with the case and portions of the framework broken away.

In carrying out my invention I employ oppositely located parallel frames which are indicated respectively at 1 and 2, these side frames being connected at desirable points. The framework thus formed, together with the mechanism contained therein is inclosed by a suitable case 3, the forward side of which is provided with a hinged door 4 and the upper and contracted rear portion of which is provided with front and rear oppositely located glass filled openings 5. In the lower portion of the casing is formed a drawer way, within which is arranged to fit and slide a suitable cash drawer 6. Above this cash drawer and between the forward portions of the frames 1 and 2 extends a transverse rod 7. Fulcrumed on the rod 7 adjacent to each other are the inner end portions of depressible key levers, the outer portions of which are projected through a slotted opening 8 in the forward portion of the case 3. These key levers which are provided with forward extensions are terminated in lettered or numbered buttons or heads 9. As indicated in the drawings the button carrying extensions of the key levers are alternately bent downward and upward, thus arranging the buttons 9 in two rows across the front of the machine. The group of key buttons or heads to the left are lettered to indicate initials, there being four of these initial keys as indicated in Fig. 1. To the right of the initial keys are arranged a series of value keys, the buttons or heads thereof being provided with numbers indicating amounts. The first nine keys to the right of the initial keys indicate amounts in dollars from one to nine inclusive; the nine keys to the right of said dollars keys indicating cents in multiples of ten and the last nine value keys to the right indicating cents from one to nine inclusive. To the right of the value keys thus arranged are the department keys, on the heads of which are indicated words or abbreviations of words such as "Received on account," "Cash," "Charge," "Paid out" and "No sale." In order to distinguish the different groups or series of key levers I have designated the initial levers as 10, the value key levers as 11 and the department key levers as 12. At the junction of its forwardly extending portion and its inwardly extending body, each of the key levers is provided with or intersected by a curved shield plate 13, which in addition to other uses is designed to operate as a check or guard against the insertion of wires or instruments through the slotted openings 8 of the case. Each of these plates 13 is provided on its inner side and lower end portion with a projecting lug 14. As shown at 15 in Figs. 2 and 13 of the drawing, the initial key levers are provided in rear of their fulcrum point with short upturned or hook like projections. Each of the key levers 10, 11 and 12 is provided in rear of its plate 13 with a laterally projecting pin 16, the underside of which is inclined or beveled as indicated more clearly in dotted lines in Figs. 12, 13 and 14 of the drawing. For the purpose hereinafter set forth, I provide the last or no sale key lever to the right with a downwardly projecting arm 12ª from which projects laterally a pin 12ᵇ.

Below the key levers I provide a horizontal shaft 17 on which is mounted the end arms of a yoke frame 18, see Fig. 11. The longitudinal bar of this yoke frame 18 is cut away or recessed on its rear side and left hand portion, resulting in the formation of a rearwardly projecting shoulder portion 18ª which extends throughout the greater portion of the length of said yoke bar and which normally bears against the slightly curved forward portions of upright value key lock bars 19, these lock bars as well as the hereinafter described initial and department key lock bars being supported on the shaft 17 and held in vertical positions by spring strips 20 which rise from a horizontal frame bar 21. Of the lock bars 19 there is one for each of the value keys and to the left of these bars 19 are arranged similar lock bars 22, one for each of the initial keys and to the right of the value lock bars 19 are arranged department lock bars 23, one for each of the department keys. Each of said lock bars thus provided has formed on one side thereof a stop projection in the form of a short rack bar 24, the latter being toothed or notched on its front and rear sides, the front notches thereof being so formed or inclined as to present horizontal stop shoulders or projections to a body passing vertically downward in line therewith, while the rear notches are reversed to present horizontal stop shoulders adapted to engage a body passing upward in the path thereof. Owing to the formation of the rear side recess at the left hand portion of the yoke bar 18, the latter is out of contact with the forward sides of the initial lock bars 22. I also mount or journal upon the shaft 17 adjacent to its end portions, the ends of a yoke frame 25 which comprises a horizontal bar 25ª which extends parallel with the shaft 17 and in rear of the lock bars a forwardly and upwardly extending end piece 25ᵇ and a similar although shorter end piece 25ᶜ. The yoke end 25ᵇ at the left is provided at its upper and forward end with an arm 25ᵈ which extends as shown in Fig. 13 of the drawing, in front of the initial lock bars 22, while the yoke frame end 25ᶜ is provided with a laterally extending arm 25ᵉ in front of the department lock bars 23. In addition to the yokes 18 and 25, I mount on the shaft 17 the end portions 26ª of a yoke frame 26, the latter having its body extending in front of the value key lock plates 19 and at its right side having a rearwardly projecting or shoulder portion 26ᵇ which bears against the forward sides or edges of the department lock plates 23.

Each of the depressible department, value and initial keys are normally retained in their upper positions through the medium of springs 28 which are mounted on the shaft 7. (See Figs. 2 and 3).

Figures 15, 16, 17:
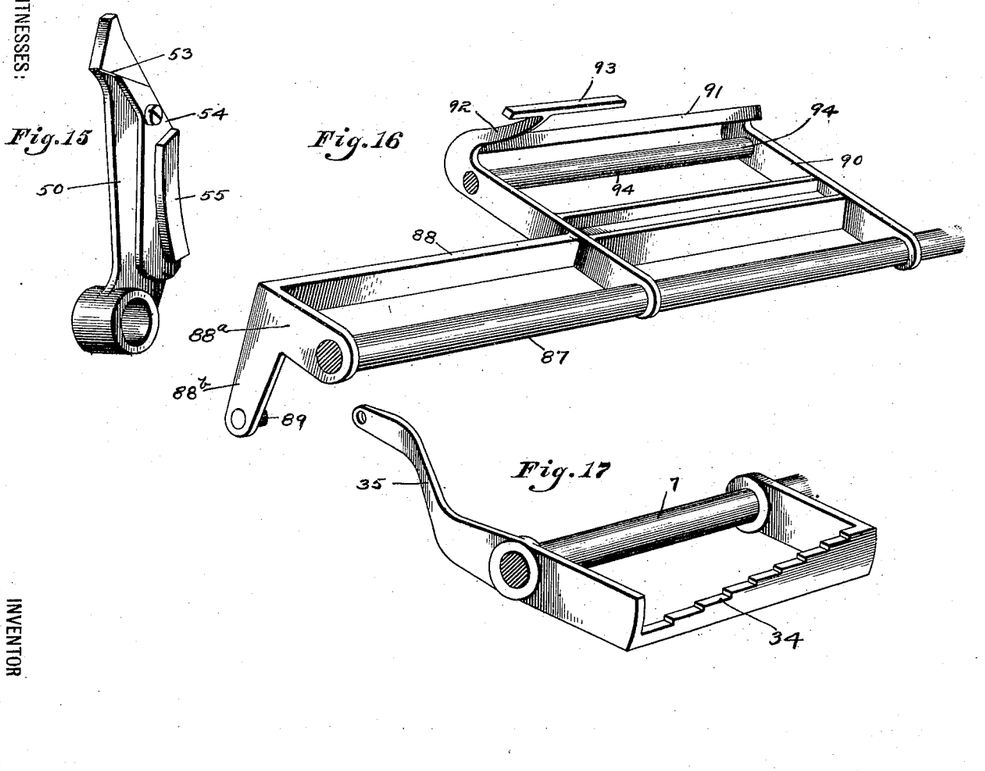
Fig. 15 is a detail view in perspective of a target holder or resetter.
Fig. 16 is a similar view of a segment carrying frame.
Fig. 17 is a similar view of a target and adding wheel operating frame and Fig. 14$^A$ is a plan view of a portion of one of the key levers.

Journaled on the shaft 7 and extending forwardly beneath the key levers are stop frames 29, 30, 31, 32 and 33 there being one of these frames beneath the initial key levers, one beneath each set or group of the value keys and one beneath the set of department key levers with the exception of the no-sale key lever. The forward bar of each of these frames has formed therein graduated shoulders or steps 34 which increase in height from left to right (see Fig. 17) there being one of these steps for each key lever of the set or group of keys to which said frame belongs. Each of the frames 29 to 33 is provided on one side with a rearwardly extending arm 35. I also mount on the shaft 7 and cause to extend forwardly within the initial stop frame 29 a frame 36 with the forward bar of which are adapted to come into contact the depressed initial key levers. This frame 36 is provided with a rearwardly extending arm 36$^a$ (see Fig. 2) in the rear termination of which is fixed a laterally projecting pin 36$^b$.

Within the upper rear and contracted portion of the casing 3 are journaled on a horizontal shaft 37 the rotary targets or indicators which may be described as follows:. As indicated more clearly in Fig. 1 of the drawing, I employ a double set of targets one set being adapted to display the amounts, the initials of the operator and the character of the sale from the front of the machine while the remaining set is likewise adapted to display said indications from the rear. The targets to the extreme left and right which are indicated respectively at 38 and 38$^a$ are the initial targets, while the larger targets on the inner sides of said initial targets and which are indicated respectively at 39 and 39$^a$, are for the purpose of displaying the department indications. On the inner side of each of the department targets is a value target, the latter being indicated at 40 and 40$^a$ and displaying dollars indications from naught to nine inclusive. Those targets 41 and 41$^a$ which are on the inner side of said dollars targets indicate dimes, while the central and double target 42 has arranged on its periphery a double set of numerals indicating cents, one set of said numerals being adapted to be read from the front and the other from the rear of the machine.

Figure 2:
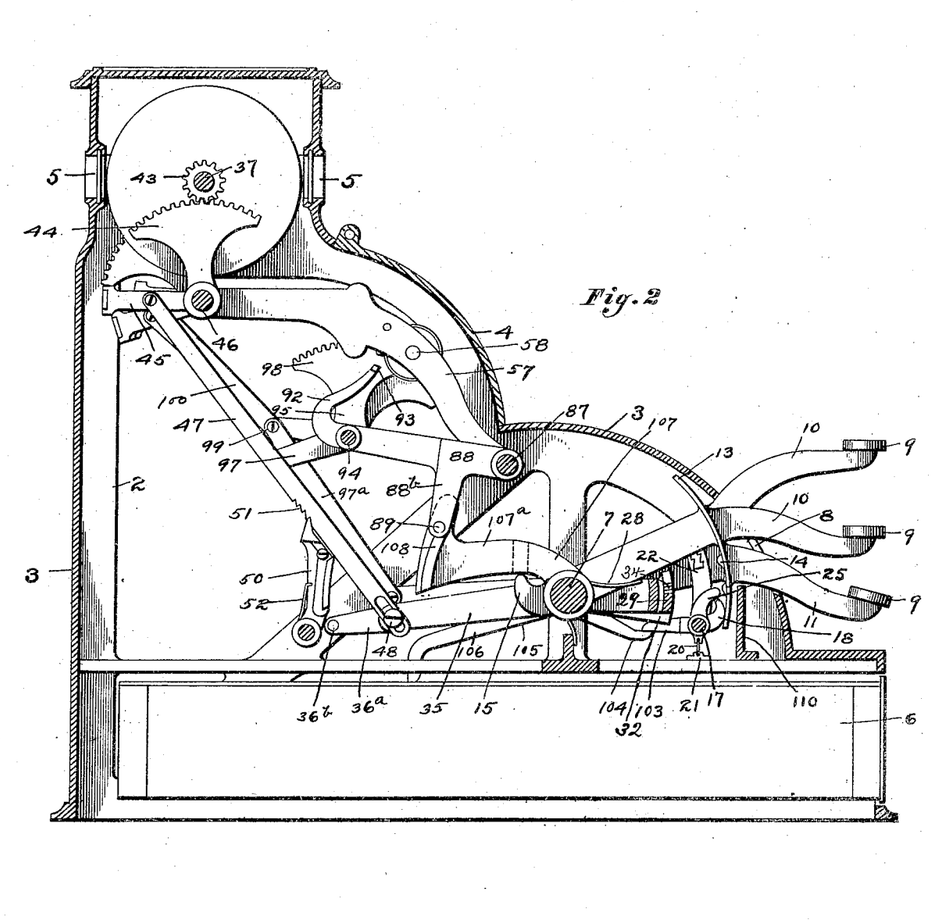
Fig. 2 is a sectional view on line $x\ x$ of Fig. 1.

Each of the targets above described is provided on one side with a projecting pinion wheel 43. With each of the pinion wheels 43 gears a segment 44, the latter forming upwardly extending arms of yoke like frames 45 the longer bars of which extend in rear of and parallel with the shaft 46 upon which said frames are mounted to turn. These yokes 45 serve to connect those pairs of segments 44 which operate corresponding targets, for instance, one of said yoke frames 45 connects the two segments 44 which operate or gear with the pinions 43 of both the initial targets and another of said yoke frames serves to connect the pair of segments which gear with the pinions 43 of the dimes targets. That yoke frame 45 which connects the initial target operating segments 44 has pivotally connected with one of its side arms, as shown in Fig. 2, the upper end of a downwardly extending and forwardly inclined connecting bar 47 the lower end of this bar 47 being longitudinally slotted and said slotted portion receiving loosely a screw or pin 48 which connects said bar with the end of the rearwardly extending arm 35 of the initial stop frame 29.

50 represents a pawl the lower end of which is suitably pivoted in the framework (see Figs. 2 and 15) and the upper tooth end of which is adapted to engage the desired one of a series of notches 51 formed in the rear side of the bar 47, said pawl being normally held in engagement with said bar through the medium of a spring 52 which exerts a forward influence. As shown more clearly in Fig. 15 the pawl 50 is provided in its upper portion on one side with an enlargement forming an inclined shoulder 53 and against this shoulder is adapted to abut the upper corresponding inclined end of a plate 54 which is pivoted in its upper portion to the pawl body 50 and which owing to the contact of its inclined upper end with the inclined shoulder 53 has its lower end portion detained against rearward swinging movement. The plate 54 below its pivot point is provided with a slightly curved laterally projecting guide lug 55 which runs lengthwise of said plate.

Supported in the forward and upper portion of the machine are the end bars 56 of an oblong frame 57 and journaled centrally and horizontally within said frame is a registering wheel carrying shaft 58. On this shaft 58 are journaled the hub portions 59$^a$ of registering or adding wheels 59, 60, 61, 62, 63, 64, 65 and 66. Each of these wheels have indicated on their peripheries successively arranged numerals from naught to nine. The numerals on the wheel to the right indicate cents and the remaining wheels counting from right to left respectively indicate dimes, dollars, tens of dollars, hundreds of dollars, thousands of dollars, tens of thousands and hundreds of thousands. Each of these registering wheels is also provided on one side with a projecting pinion 67 and on its opposite side with a laterally projecting circular flange 68, this projecting flange or rim having formed on its periphery a projecting tooth or shoulder 69. Mounted to swing on the shaft 58 between the adding wheels are arms 70, said arm on one side of the shaft terminating in a finger 71 having a beveled end portion and on the remaining or opposite side of the shaft, said arm is thickened or enlarged laterally, as shown more clearly in Fig. 4. Through this enlarged portion of each of said arms passes loosely a spring actuated bolt 72 the inner end or beveled head of which is normally pressed into engagement with a tooth notch of the adding wheel pinion 67 which is to the left of the body of the arm.

Mounted on a transverse frame bar 57ª which extends between the end frame bars 56 beneath the adding wheels and located one to the left of each of said adding wheels is a bolt keeper or casing 73 and within each of these keepers 73 is provided a spring actuated bolt 74 the outwardly projecting end or head of which is formed with two adjoining faces which incline in opposite directions, these inclined faces being indicated respectively at 75 and 76. The finger portion 71 as shown more clearly in Figs. 5 and 7 of the drawing, normally engages or is retained in stop contact with that portion of the bolt head 74 which is provided with the inclined face 75, this contact being insured by a suitable spring 77, the tendency of which is to rotate said arms 70 in the direction of the arrows shown in said figures. That portion of the arm 70 which carries the bolt 72 is provided with a laterally extending finger 78 which is adapted for the purpose hereinafter set forth.

Rising from the frame bar 57ª between each pair of adding or registering wheels is a fixed arm 79, the latter having an inclined shoulder 79ª which lies in the path of the outer end of the finger portion 71 of the arm 70. Arranged within the cross bar 57ª and beneath each of the pinions 67 is a spring actuated bolt 80 the head of which engages a tooth notch of the corresponding pinion (see Fig. 6). On the shaft 58 and on the inner side of one of the frame end bars 56 is formed a flange 81 between which and the adjacent frame bar 56 is interposed a spring 82. The shaft 58 is adapted to move longitudinally in its bearings and, on the outer side of the collar or flange 81 is passes loosely through the frame bar 56 and a boss 56ª thereon and on the outer side of the latter said shaft carries a finger wheel 83, the latter having on its inner face a short neck like projection 83ª on the end of which is formed projections 83ᵇ which normally engage correspondingly shaped notches in the ring boss 56ª, this engagement being insured by the pressure of the spring 82 against the flange 81 of the shaft. On the shaft 58 adjacent to the hub portion of each of the adding or registering wheels I provide a projecting pin 84 (see Figs. 9 and 10), these pins adapted by an outward movement of the shaft 58 to be brought in the paths of projections 85 which are formed within the recessed end portions 86 of the hubs 59ª.

Figure 3:
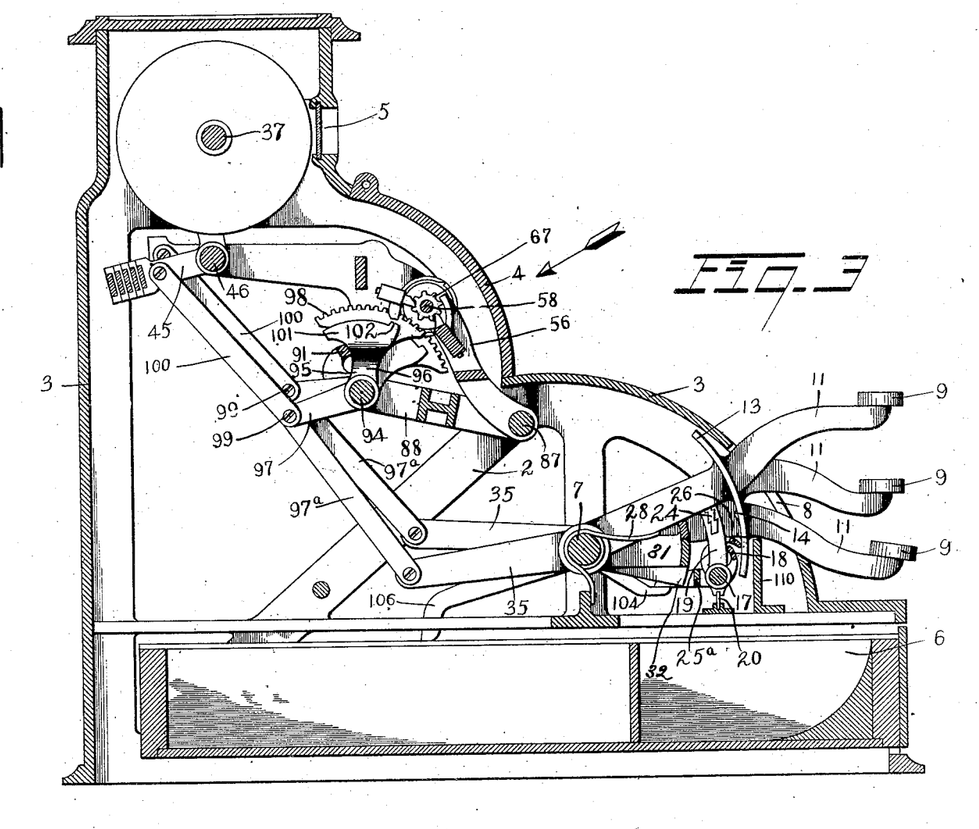
Fig. 3 is a similar view on line $y\ y$ of Fig. 1.

Extending between the side frames of the machine in the forward portion thereof below and in front of the registering wheels previously described is a shaft 87 (see Figs. 3 and 16) and on this shaft is journaled a rearwardly extending frame 88 the short end bar 88ª at the left of which has formed therewith a downwardly extending arm 88ᵇ, the lower end of which is provided with an inwardly projecting pin 89. The right hand portion of the frame 88 is provided with a rearward extension 90, the rear horizontal bar 91 of which is raised and projected forwardly as shown more clearly in Fig. 3. That side arm of the frame extension 90 which is to the left is provided with an upwardly and forwardly inclined arm extension 92 which carries a horizontal head bar 93, the latter being in position when properly elevated to contact with the four arms 70 of the adding mechanism which are in front thereof when said arms are in their operated position. Within the frame extension 90 is provided a fixed horizontal rod 94 with which are connected at the junction of their arms bell cranks 95, each of these bell cranks consisting of an upwardly projected arm 96 and a rearwardly projected arm 97 the arm 96 terminating in a toothed wheel segment 98, there being one of these segment arms for each of the adding wheel pinions 67 that are connected with the cents, dimes and dollars registering wheels. Each of the arms 97 of the bell cranks 96 is pivotally connected as indicated at 99 to the lower end of an upwardly and rearwardly inclined connecting bar 100, these bars 100 having their upper ends pivotally connected with the sides of those frame yokes 45 which through the segments 44 operate the targets which display values corresponding with the values intended to be indicated by the registering wheels with which they are adapted to be connected through the medium of the bars 100, bell cranks 95, segments 98 and pinions 67. Each of the bell crank arms 97 also has its outer end pivotally connected with a downwardly and forwardly inclined bar 97ª, the lower ends of these bars being pivotally connected with the corresponding step frame arms 35 (see Fig. 3). As shown more clearly in Fig. 8 of the drawing, each of the segments 98 has formed on its left side an outwardly and thence upwardly extending arm 101, the elongated head of which is provided with a curved upper surface and which at one end has a shoulder projection 102. As indicated in Fig. 3 of the drawing, the segment carrying frame 88 is normally so depressed as to prevent the engagement of the teeth of said segments with the teeth of the registering wheel pinions 67.

Mounted to swing on the shaft 7 and having its rear horizontal bar extending above the rear portions of the initial key levers is a rearwardly extending yoke frame 107 (see Figs. 1 and 2). One of the side arms 107ª of this frame, as shown in Fig. 2, has its rear end portion enlarged upwardly and on said enlargement is formed a laterally projecting and slightly curved shoulder or rib 108 against the upper portion and outer side of which normally bears the pin 89 of the frame arm 88ᵇ. The rib 108 has its lower end enlarged rearwardly as shown, for a purpose hereinafter specified. The arm 35 of the stepped frame 33 which belongs to the department key set is pivotally connected at its outer end with a bar 109 which at its remaining end is pivotally connected with that yoke 45 which operates the segment 44 of the department target 39ᵃ at the right.

Figures 11, 12, 13, 14, 14A:
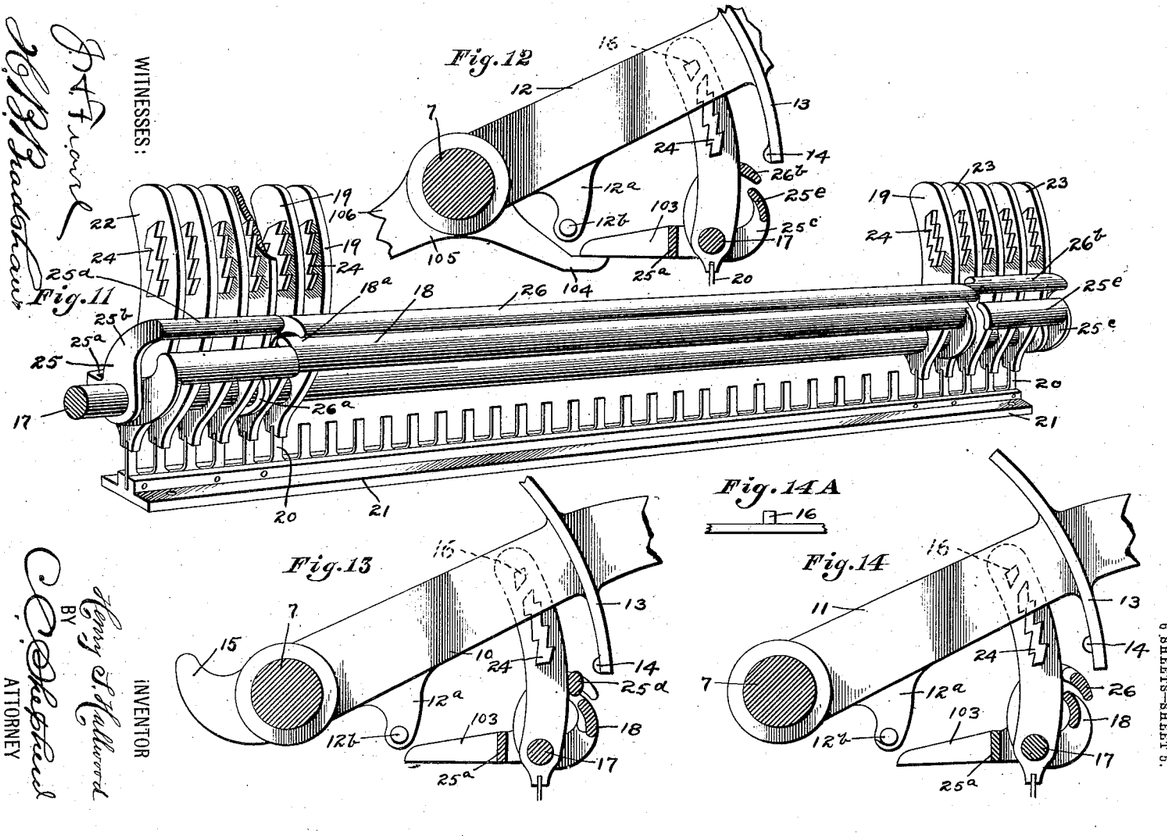

As indicated more clearly in Fig. 12 of the drawing, I provide the side arm 25ᶜ of the yoke 25 with a rearward extension or finger 103 which normally contacts with the upper side of the downwardly and forwardly extending arm 104 of an angular lever 105 the rearwardly and downwardly extending longer arm 106 of which has its hook like end which is shown in Fig. 2 of the drawing, normally engaging the drawer 6 and latching the latter against outward movement.

Figures 4, 5, 6, 7, 8, 9, 10:
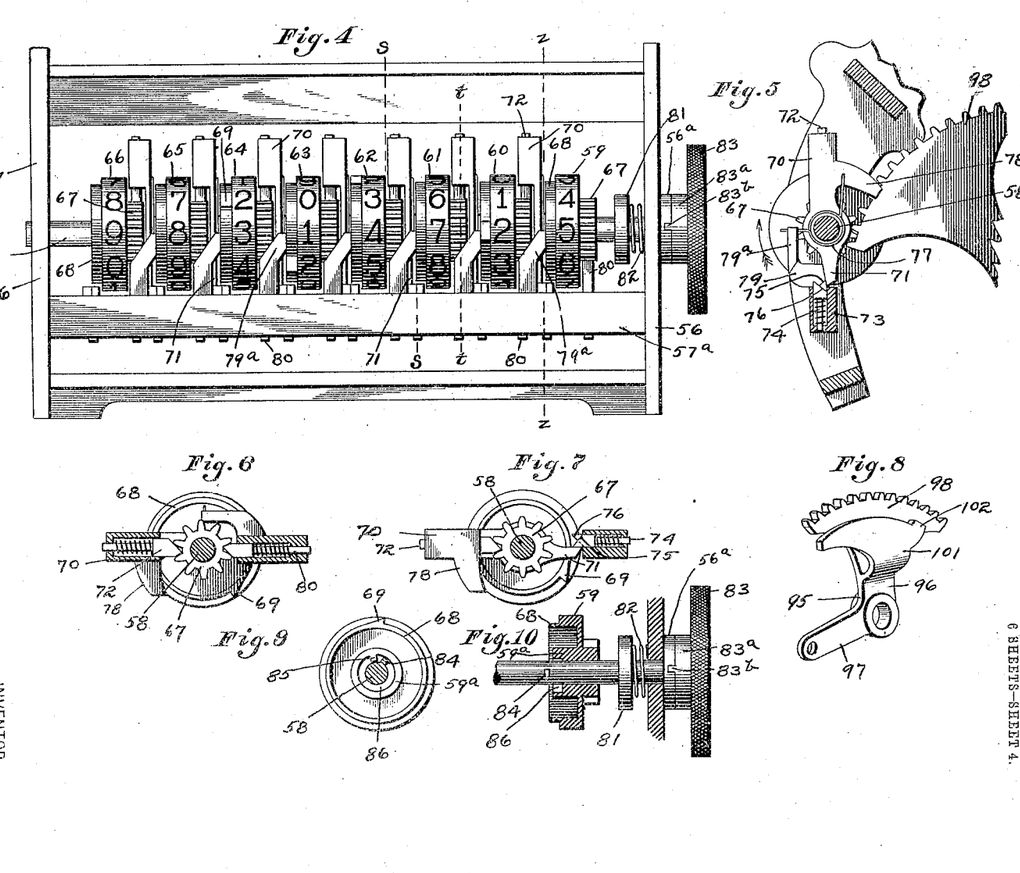
Fig. 4 is a detail view of the registering wheels looking in the direction of the arrow indicated in Fig. 3.
Fig. 5 is a sectional view on line $z\ z$ of Fig. 4.
Fig. 6 is a sectional view on line $t\ t$ of Fig. 4.
Fig. 7 is a sectional view on line $s\ s$ of Fig. 4, the same being taken as indicated on two planes.
Fig. 8 is a detail view in perspective of one of the registering wheel operating segments.
Fig. 9 is a transverse section through the adding wheel carrying shaft showing thereon one of the adding wheels in side elevation.
Fig. 10 is a view partially in section and partially in elevation illustrating means for turning or resetting the adding wheels to display the zero signs.

In order to facilitate the description of the operation of the mechanism hereinbefore described, I have shown in the drawings the five cent value key and a cash department key depressed. Assuming that a five cent sale is to be registered and indicated by the operator whose initial is "D", the first operation consists in depressing the head of the D key lever until said lever contacts with its step 34 of the initial step frame 29, and depresses the latter until the key lever is in contact with a stop bar 110 which rises from the upper base frame plate. The upward movement thus imparted to the upturned end 15 of the D key lever, results in a lifting contact with the frame 107ᵃ and through the outward pressure of the rib or projection 108 of said frame side arm on the pin 89 (see Fig. 2) the rear portion of the frame 88 is swung upward until the segments 98 are in engagement with the pinions 67 of the adding or registering wheels. Owing to the peculiar shape of the said rib or projection, the frame 88 is not moved upwardly so as to bring the segments into mesh with the wheels until the initial key lever has been depressed to substantially its full extent. The pressure described of the initial key, also results in a contact of said key lever with the frame 36 and in an upward movement of the arm 36ᵃ thereof and in the pin 36ᵇ thereof traveling against the forward side of the lateral projection 55 of the pawl 50 and forcing the point of the pawl out of engagement with a tooth 51 of the bar 47. The dropping of the pin 36ᵇ, however, over the top of the projection 55 permits the pawl point to move forward and reëngage one of the notches 51 of the bar 47 when the latter has been lifted through upward movement of the initial step frame arm 35. The upward movement thus imparted to the bar 47 and its engagement with one of the yokes 45 results in the swinging of the initial targets 38 and 38ᵃ to display the initial D at the front and rear thereof respectively. In the downward movement of either the initial, value or department key levers, the inclined lower sides of the key lever pins 16 come into contact with the inclined upper sides of the ratchet like projections 24 of the blades 22, 19 or 23 forcing the latter forward and permitting the key lever pins to pass downward on the rear side thereof and engage the undersides of said projections when said blades spring rearward to their normal positions. The descent of the initial key lever also results in the projecting lug 14 of its shield 13 contacting with the yoke 18 and through pressure of the projecting portion 18ᵃ of said yoke against the value key blades 19 in forcing the latter rearward thereby disengaging the pins 16 from the undersides of the projections 24 of any previously depressed value keys and permitting the latter to return to their normal positions. This release of the value keys takes place prior to the meshing of the segments 98 with the pinions of the registering wheels, as heretofore described. It will be seen, therefore, that the said segments will be permitted to return to their normal positions before they are again lifted into mesh with the adding wheel pinions. We will now assume that the five cent value key is depressed until the key lever contacts with one of the steps of the step frame 32 and said frame is depressed to its limit. The upward movement of the arm 35 of the depressed step frame thus caused, results through its connection with that segment 98 which operates the cents registering wheel pinion 67, in said cents registering wheel being rotated until the numeral five is displayed from the front thereof as shown in Fig. 4. The upward movement of the step frame arm 35 also results through its connection with that yoke 45 which operates the segment 44 which gears with the pinion 43 of the cents target 42 in rotating said target to display the numeral five on the front and rear sides thereof respectively. The downward movement of the five cent value key and the consequent engagement of its short projection 14 with the yoke 26 results in said yoke being forced rearward causing its portion 26ᵇ to exert a rearward pressure on the blades 23 thereby disengaging the pin 16 of any department key or keys previously depressed from the undersides of the ratchet like projections 24 of said blades 23 and permitting said department keys to rise to their normal positions. Now assuming that one of the department keys, for instance the cash key, is depressed until the key lever or bar thereof is in contact with its step of the frame 33 and the latter is depressed to its limit, it will be observed that the upward movement imparted to the arm 35 of the step frame 33 will result through its connection with that frame yoke 45, the movement of which results in the operation of the segments 44 which engage the pinions 43 of the department targets 39 and 39ª, in the rotation of said department targets to display on the front and rear sides thereof respectively the words "Cash". In its downward movement, the cash key lever by contact with the arm 25ᵉ of the yoke 25 results in so swinging said yoke as to cause its arm 25ᵈ to exert a rearward pressure on the initial blades 22 releasing thereby from the undersides of the ratchet like projections 24 the pin 16 of the previously depressed initial key and permitting the latter to rise to its normal position. Through the release of the depressed initial key, it is obvious that the frame 107ª will be permitted to drop to its normal position with the result that the segment carrying frame 88 will swing downward until the segments 98 are out of engagement with the teeth of the registering wheel pinions.

In the depression of the department key heretofore described and the depression of the rear bar 25ª of the yoke frame 25 (see Fig. 12), the rearwardly extending arm 103 of said yoke frame exerts such pressure on the arm 104 of the drawer catch lever 105 as to raise the arm 106 of said catch lever out of engagement with the drawer and thus permit the drawer to be drawn forward or opened. The no sale key which as shown in the drawing, forms one of the group of department keys has its key lever extending to one side of the step frame 33 and out of position to contact with the latter when depressed. However, on the depression of a no sale key, it will be seen that the pin 12ᵇ of its arm 12ª (see Fig. 12) will contact with and depress the arm 104 of the drawer catch lever 105, thus permitting the drawer to be released by the depression of the no sale key.

I will now proceed to describe the manner of transferring amounts from one of the registering wheels to the other and in order to illustrate this operation, I will assume that a five cent sale and registration had taken place prior to that herein described. In this second five cent registration, the cents registering wheel 59 is rotated until its shoulder 69 by contact with the inclined face 76 of the bolt 74, depresses said bolt and causes a disengagement of the finger 71 of the arm 70 and the portion 75 of the bolt, thus permitting the arm 70 to swing through action of its spring until its finger 71 contacts with the shoulder 79ª of the next stop bar 79 to the left. Owing to the engagement of the bolt 72 with the teeth of the pinion 67 of the dimes registering wheel 60 the latter is carried until the numeral 1 is displayed from the front thereof, while the cents registering wheel has been moved in the manner described, until the naught sign is displayed opposite said numeral 1, the reading of the cents and dimes registering wheels thus indicating that ten cents has been registered. The engagement of the bolts 80 of the frame 57ª with the registering wheel pinion wheel serve to prevent a backward rotation of the latter. It will readily be understood that the above described operation of transferring from the cents to the dimes wheel will apply to the transfer of amounts from the dimes to the dollars, dollars to tens of dollars and so on throughout the remaining registering wheels. The first three arms 70 to the right are adapted to be re-set after having been operated as above described through the depression of an initial key which results in the manner heretofore described, in the raising of the segments 98 into engagement with the pinions 67 and in this upward swinging movement of said segments the shoulders 102 of the segment plates 101 (see Fig. 8) come into contact with the ends of the arms 78 of said operated arms 70, resulting in swinging the latter until their fingers 71 are again in engagement with the projecting portion 75 of the bolt 74. The segment 98 for the units wheel 59 carries the plate 101 and the shoulder 102 for re-setting the arm 70 that transfers values from said wheel to the tens wheel 60, and the segment for the latter wheel also carries the plate and shoulder for operating the transfer pawl arm for the next wheel and so on. This being true, it will be seen that there can be no addition to the register wheel to necessitate a transfer without moving the shoulder 102 away from contact with the arm 78 of its pawl carrier. This lug being thus removed, the said arm 78 is free to be thrown backwardly, when tripped by the shoulder 69 on the adding wheel, until the said arm 78 contacts with the smooth edge of the plate 101. This movement is sufficient to carry the finger 71 connected with the arm 70 away from the bolt 74 so that the latter cannot re-engage the same after the shoulder 69 has passed beyond the bolt. When the department key is depressed and the segments fall, the transfer is completed by the rocking of the pawl arm 70 until the finger 71 engages with the shoulder 79ª as heretofore described. The remainder of the arms 70 to the left are adapted to be returned to their normal positions by contact with the terminal bar 93 of the arm 92 of the frame 88 when the latter is swung upward by depression of an initial key. The initial key must be depressed a distance sufficient to enable its pin 16 to pass below the ratchet bar 24 that coöperates therewith or until the key engages with the stop bar 110. It will be understood that after the pin has passed the rack, the key will settle back slightly until it is caught by the rack, where it will be held. This slight backward movement of the key permits the terminal bar 93 to drop a distance sufficient to separate it from the transfer arms that coöperate therewith so that said arms may be moved when they are tripped in transferring a distance sufficient to prevent them from being reëngaged by their bolts 74. The transfer does not take place in any case until the segment-carrying frame is dropped upon the depression of a department key. In the operation of resetting the registering wheels to display the naught signs from the front, the finger wheel 83 and shaft 58 is pulled outward until the projection 83ᵇ is out of engagement with the notches of the collar or projection 56ᵃ of the frame 56. In this outward movement of said shaft 58 the pins 84 thereof are brought into position to contact with the inwardly projecting lugs 85 of the registering wheels, thereby causing a rotation of said registering wheels when the shaft 58 is rotated and permitting said wheels to be turned until the naught signs are displayed from their forward sides.

Having now fully described my invention, what I claim and desire to secure by Letters Patent is,

1. In a register, the combination with depressible keys arranged in sets, of a full stroke device for and associated with each of said keys, said device compelling the complete movement of its associated key in one direction and locking the key in its depressed position, and means operated by a key in another set for moving all the full-stroke devices belonging to the set containing the key first depressed whereby the latter key is released.

2. In a cash register, a normally locked cash drawer, a set of value keys, a set of initial keys and a set of department keys, means for locking the initial keys in depressed position, means operated by the value keys for releasing the locked initial keys, means for locking the depressed value keys, means for releasing the locked value keys upon the depression of a department key, and means operated by the department keys for unlocking the cash drawer.

3. In a cash register, the combination with sets of depressible initial, value and department keys, of means for locking any key in any set when depressed, means operated by the value keys for unlocking the depressed initial keys, means operated by the department keys for unlocking the depressed value keys, and means operated by the initial keys for unlocking the depressed department keys.

4. In a cash register, the combination of sets of depressible value and special keys, a stationary registering mechanism comprising registering wheels, gear segments adapted to engage said registering wheels, means whereby the depression of one of said special keys produces a gear engagement of said segments and registering wheels, and connections between the value keys and the segments, whereby the depression of a value key, following the depression of a special key, will turn the registering wheels to add the values of the depressed value keys on said wheels substantially as specified.

5. In a cash register, the combination with depressible value and special keys, a registering mechanism and indicating targets, of gear segments for said registering wheels and gear segments for said targets, mechanism whereby the depression of the keys of any of said sets operates the target controlling segments, and mechanism whereby the registering wheel cannot be operated by its controlling segment until a special key has been depressed, substantially as specified.

6. In a cash register, the combination with fulcrumed depressible keys each having a projection 16 thereof, of a normally vertical yielding blade mounted below and adjacent to each of said keys, each of said blades having a lateral projection 24 formed with a series of steps or shoulders on its opposite sides, said blade adapted to be pressed outward by contact of one of said key pins with said projection 24 in the downward movement of the frame and said shoulders adapted to prevent the upward movement of the key pin until the blade is pressed in the opposite direction, substantially as specified.

7. In a cash register, the combination with sets of depressible fulcrumed keys, yielding blades mounted below said keys, means connected with said keys and blades whereby the return of a depressed key is prevented until said blades are moved out of vertical position and mechanism whereby such movement of said blades is imparted by the depression of a key of another set.

8. In a cash register, the combination with depressible keys, a registering mechanism comprising rotatable numbered wheels adapted to register and indicate amounts corresponding with the amounts represented by the keys depressed, and operating gear segments for each of said registering wheels, said gear segments adapted to be operated by the depression of said keys and each of said segments having a shouldered bracket arm 101, of spring actuated swinging arms 70 engaging the registering wheels, said arms normally locked against rotation and adapted to be released by contact with a projection on the adjoining registering wheel, said arms adapted to be returned to their locked positions by contact with the shoulders of said gear segment bracket arms, substantially as specified.

9. In a register, an initial and a value key, means for holding said value key depressed, a registering device that is normally out of operative relation with the value key, and means operated by the initial key for releasing the value key and for placing it in operative relation with the registering device.

10. In a register, a set of special keys and a set of value keys, an indicating device for each of said sets, said devices being normally in indicating position, and means connecting the special keys with the indicating devices whereby the depression of one of these keys releases both of said devices and resets its own indicating device.

11. In a register, a set of special and a set of value keys, locking devices for normally holding a depressed value key in its operated position, and means controlled by the special keys for unlocking the depressed value key upon the operation of a special key.

12. In a register, a single registering device, a set of value keys by which the registering device may be operated, said registering device and value keys being normally disconnected, a set of special keys, and means operated upon the depression of any special key for connecting the value keys and the registering device.

13. In a register, a special key, a value key, a registering device comprising a plurality of registering wheels, connections between the value key and the registering device, transfer mechanisms connecting the register wheels, and means for restoring the displaced transfer mechanisms upon the depression of a special key.

14. In a register, a plurality of registering wheels, means for separately operating said wheels, said operating means being mounted for movement into or out of engagement with the wheels, transfer devices coöperating with the register wheels, and means connected with the said operating means for permitting the transfer devices to operate as the operating means moves out of engagement with the registering wheels, and for restoring the said devices as the said operating means moves into engagement with the registering wheels.

15. A key board mechanism comprising groups of keys, means for locking the keys of each group when depressed, and means controlled by the keys of one group for unlocking all the other groups of keys except one.

16. In a register, a normally depressed department key, an indicator for said key that is held in indicating position while said key is depressed, a value key, and means for releasing the department key and its indicator upon the depression of the value key.

17. In a register, a registering device, a value key for determining the operation of the registering device, operating means for the registering device that are normally out of connection therewith, a special key for connecting the said operating means and the registering device, and a second special key for disconnecting the same.

18. In a register, a registering device, a value key for determining the operation of the registering device, operating means for the registering device that are normally out of connection therewith, an initial key for connecting the said operating means and the registering device, and a department key for disconnecting the same.

19. In a register a set of special keys, means for locking said keys when depressed, a second set of special keys, means for locking said second set of keys when depressed, and means operated by the said second set as they are depressed for releasing the depressed keys of the first set.

20. In a register, a drawer, means for holding the drawer in a closed position, an initial key, means for locking said key when depressed, a department key, and means operated by the department key for releasing the drawer and the initial key.

21. In a registering machine, three or more sets of keys of different characters, such as initial, value and department keys, locking devices for holding the keys in their depressed positions, and means controlled by the keys of one set to release the depressed key in one other set, the keys in the remaining sets being unaffected.

22. In a registering machine, three or more sets of keys of different characters, such as initial, value and department keys, devices for holding the keys in their depressed positions, means requiring the depression of a key in each set at each operation of the machine, and means whereby the depression of a key in either set releases the depressed key in one of the other sets.

23. In a registering machine, the combination of sets of depressible keys, an oscillating target connected with each set of keys and adapted to move therewith, means requiring the operation of the keys in the different sets according to a certain order, means for locking the keys in their depressed positions, and means for releasing the keys and the targets according to a certain order.

24. In a registering machine, depressible keys, means for holding the keys when depressed at one operation of the machine, and means for releasing said keys only at the succeeding operation of the machine.

25. In a cash register, value keys, special keys, means controlled by certain special keys for releasing the depressed value keys, and means controlled by the value keys for releasing certain special keys.

26. In a cash register, value keys, special keys, a registering device, means for operating said device from the value keys, said means being normally disconnected from the registering device, and means controlled by the special keys for connecting the said operating means with the registering device.

HENRY S. HALLWOOD.

In the presence of—
A. L. PHELPS,
F. G. ZWERNER.

---

Copies of this patent may be obtained for five cents each, by addressing the "Commissioner of Patents, Washington, D. C."